Dec. 21, 1954   G. LOUIS   2,697,359
SPEED VARIATOR
Filed Aug. 17, 1949   2 Sheets-Sheet 1
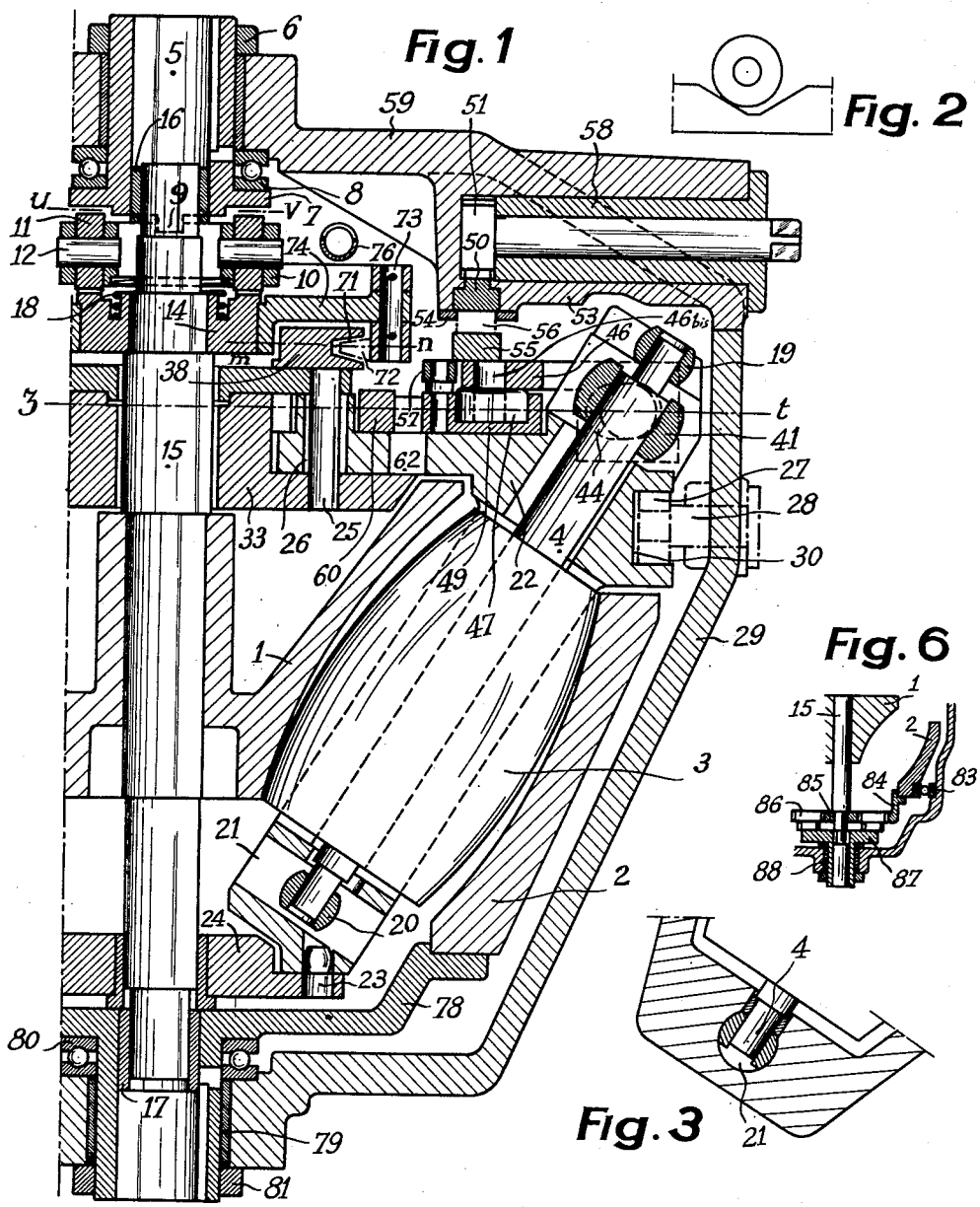

Dec. 21, 1954

G. LOUIS 2,697,359

SPEED VARIATOR

Filed Aug. 17, 1949

2 Sheets-Sheet 2

Inventor
Gerard Alexis Louis

United States Patent Office 2,697,359
Patented Dec. 21, 1954

2,697,359

SPEED VARIATOR

Gerard Louis, Clichy sur Seine, France

Application August 17, 1949, Serial No. 110,860

Claims priority, application France September 8, 1948

5 Claims. (Cl. 74—193)

The invention relates to improvements in mechanisms which, driven by a member turning at constant speed give to another member any speed at will, comprised in a continuous range between two extreme values, and of the kind utilising the drive by friction between surfaces rolling upon one another under such pressure as to avoid sliding.

The objects of the improvements are: first to provide a mechanism very compact, owing to the division of the charge between a number of identical transmitting organs disposed circularly around its axis; and, second, to secure a good mechanical efficiency without any care for precision in machining and mounting by the application, at all times, and obtained with only one compressing device, of the correct pressure at every point of contact, and by the automatic equalisation of the charge between identical points of contact.

One preferred form of the invention is illustrated in the accompanying drawings in which:

Fig. 1 is a vertical section by the axis of the variator.

Fig. 2 a partial side view of the compressing device.

Fig. 3 a partial section of the variator, on the line $pq$, Fig. 1.

Figure 4:
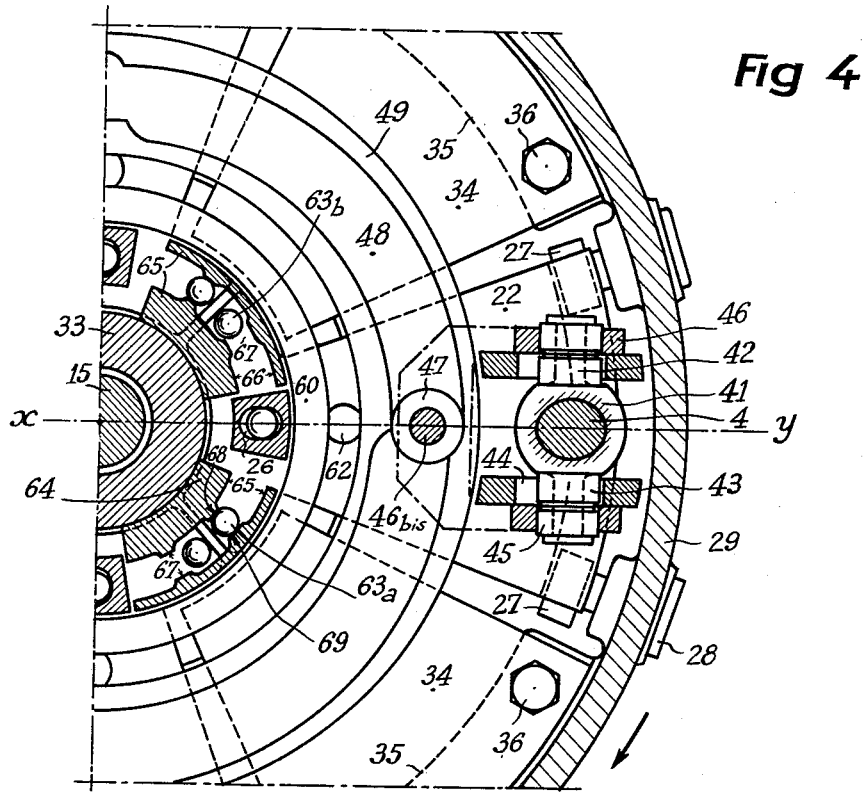

Fig. 4 a plan view, from above, of the section on the line $zt$, Fig. 1.

Figure 5:
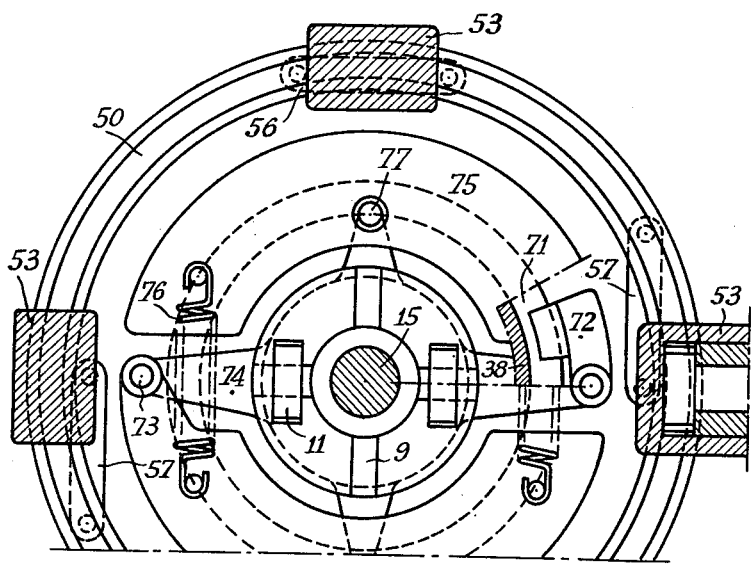

Fig. 5 a section, seen from above, of the upper part of the variator, on the line $mn$, Fig. 1.

Fig. 6 a schema showing the application of an epicycloidal train to the variator.

The member 1 whose active surface is generated by the revolution of a convenient curve around the axis of the variator drives the active surface of the member 2, also generated by the revolution of a curve, by the medium of the active surfaces of several bobbins 3, here supposed four in number similarly generated, whose axes are practically situated in radial planes and can be varied in position in these planes, so displacing the points of contact with the members 1 and 2, and, supposing 1 the driving member, giving to 2 a variable angular velocity.

The power is applied at constant speed to the socket 5, maintained between the ring 6 and the ball thrust bearing 8 which drives by the tongues 9 the ring 10 supporting the rollers 11 mounted on the pins 12 and acting on the helicoidal slopes 13 in the piece 14, keyed on the shaft 15 driving the internal member 1. This shaft can turn and slide longitudinally in the bushings 16 and 17, and transmits to the internal member 1 the axial thrust resulting from the axial components of the forces acting on the helicoidal slopes 13 and proportional to the power transmitted a spring 18 adds a complementary thrust to maintain, at rest, the contact between surfaces.

The meridian curves of the bobbins present in the preferred form opposite to their axes a convexity giving a circular section of maximum diameter between the extremity sections of said bobbins. The points of contact of the bobbin with the members 1 and 2 are on opposite sides of the maximum section, that is to say between said section and respectively each of the extremity sections. The longitudinal components of the sections at the points of contact are thus opposite to one another and the bobbin has only to be supported longitudinally against their difference; it can even be left free to take a longitudinal equilibrium position: in that case the spindle 4 on which is fixed the bobbin has no abutment and can slide as well as rotate in the journals 19 and 20 which support it at its extremities.

These journals are externally spherical and adjusted in cylindrical lodgings, such as 21 for the journal 20 to which they transmit the tangential pressures and in which they roll when the axis of the bobbin is tilted. These lodgings are bored in the support 22 maintained by the semi-spherical pin 23, fixed on the piece 24 centered on the shaft 15, by the pin 25 on the same axis and adjusted without lateral play in the groove 26, and finally by the two rollers 27 turning on the pins 28 fixed in the frame 29. One can see that the support 22 can tilt around the axis of the pins 23 and 25 and have a slight radial movement of its upper part; we shall see later how these movements are limited and their utility.

The pin 25 has one extremity maintained in a projection of the collar 37 fixed on the hub 33 of the piece 32, and the other in that piece 32 which has four legs 34 centering it in the frame 29 and bolted by the screws 36 on the projecting parts 35 of said frame 29.

Another journal 41, in which the spindle 4 is here free to slide and turn has two cylindrical projections 42 supporting the rollers 43 which can move themselves horizontally in the openings 44 of the support 22, and two roller bearings 45 adjusted in the piece 46 supporting on the piece 46 bis the roller 47 on which act the sides of the spiral groove 48 of the commanding ring 49. This ring is connected by an Oldham joint composed of the two pairs of connecting rods 56 and 57, at right angles, and of the auxiliary ring 55, to the gear 50, maintained in a groove of the cover 59 by the guards 54, and which can be rotated by the pinion 51, manually or mechanically operated.

The gear 50 turning of an angle, the ring 49 turns of an equal angle but can independently have a certain amount of translation in any direction perpendicular to the axis of the variator, thus becoming eccentric itself. The angular positions of the axes of the bobbins 4 are determined by both the angular position and the eccentricity of the ring 49. The first one is fixed by the angular position of the gear 50, the other one is under the dependence of the equalising system. This system utilises the pins 62 fixed on the pieces 22 and adjusted without play between the commanding ring and another independent ring 60, and the pins 63, two of which are symmetrically mounted on extensions 64 on each piece 22. These last pins are lodged in a groove 66 machined in projections 65 of the piece 38 and being narrowed down at 67 by projection parts 67 which adjust themselves, as we shall see later, depending of the direction of the rotation around one of the other of the two pins 63.

The internal member 1 turning in the direction indicated by the arrow, the axes of the bobbins and the piece 22 tends to be moved by the tangential forces in the same direction, tilting around the pins 23 and 25; this movement is opposed by the reactions of the face 68 in the narrow part 67 of the groove 66 on the pin 63a and the corresponding reactions of the ring 49 on the pins 62. The action of the pin 62 on the ring 49 is equilibrated by the action of that ring of the pin diametrally opposite; if however the bobbin seen in the Figs. 1 and 4, for instance, has a tendency to drive the member 2 faster than the opposite bobbin, so transmitting more than a greater of the charge, the reaction on the pin 62 corresponding to the first bobbin grows up and causes a slight movement of the ring 49, the piece 46 and the upper part of the axis 4 to the right, causing a reduction of the speed communicated by that bobbin and an acceleration on the opposite side, reestablishing equilibrium.

Supposing a brake applied on the driving socket, the external member 2 can possibly at that moment drive the member 1, then it tends to tilt the support 22, in the direction of its movement, which is opposite to the arrow, and causes the pin 63a to press on the face 69 of the groove 66 and the pin 62 to press on the ring 60 towards the axis of the variator. That action is opposed by the action on the ring of the pin diametrally opposite, but if the bobbin 3 tends to drive the internal member faster than the opposite bobbin, the pressure applied by the pin 62 on that side grows up and displaces the rings 60 and 49, and the piece 46 towards the axis of the variator causing a slowing down of the drive by the bobbin 3 and reestablishing equilibrium.

If the rotation of the member 1 is reversed, it is the pin 63b which must act on the piece 65 to give correct movement to the equalising system, and that piece must have turned through a certain angle to put the narrow part 67 of the groove 66 in contact with that pin. To obtain automatically this correct positioning at every inversion of the rotation of the piece 1 a V shaped groove is turned on the piece 38, in which can apply the shoes 72 integral with the axles 73 mounted on the support 74 turning with the piece 14 and fixed at their opposite extremities on the weights 75 brought towards the center by the springs 76 which at slow speeds applies the shoes 72 in the groove and move the piece 65 in the correct position. As the speed grows the springs are extended by the weights submitted to the centrifugal force so as to put the shoes 72 out of action; the movement of the weights is limited by the pins 77 lodged in holes of the pieces 75.

The equalization of the changes between opposite bobbins is thus secured in all cases; it is also obtained between each pair of bobbins by so proportioning the rings 60 and 49 as to give them a sufficient amount of elastic deformation under radial charges. If one pair of bobbins tends to drive the member 2 faster than do the other pair, the diametrally opposite actions of the pins 62 for the first pair becoming greater increases the corresponding diameter causing the first pair of bobbins to drive slower till equilibrium is reestablished.

The cup 2 is commonly fixed on the piece 78 centered in the journal 79 and maintained between the thrust bearing 80 and the collar 81, but it can be also mounted to receive, in a very simple way, as indicated in Fig. 6 a differential gear train to obtain, as usual, a larger variation of speed. The external member 2 is then supported by an oblique roller bearing and supports an internal gear 84; the axle 15 supports a pinion 85 keyed on it. The epicycloidal pinions 86 turn on axles mounted on the support 87 turning in the bearings 88 and transmitting the power.

It is easy to see that but a low degree of precision in machining and mounting is necessary for the correct operation of the mechanism: the positioning of the bobbins is practically independent of the machining of the support 22; the correct inclinations of the bobbins for the equalization of the changes are obtained automatically and independent of slight imperfections in the machining of the organs.

In other words, the perfect equalisation of the change between the bobbins and the application at every point of contact of the theoretical pressure, just sufficient to secure the drive without sliding, obtained by the correct choice of the generating curves as well as of the variable slope of the pressure cam and the automatically proportional to the power applied axial pressure on the member 1 secure the better efficiency obtainable as well as the perfect utilization of the material which contributes, with the compact disposition to obtain an economical apparatus.

The invention has been described in a particular realisation and can be varied without departing from the principle of the invention. For instance the bobbins can be concave instead of convex surface, they can be positioned longitudinally on one of their bearings; it can be simplified in more simple cases of application, for instance if the variator has not to turn in opposite directions, or has not to support braking on the driving member; the equalising system can even be omitted, if perfect precision in machining is secured, without destroying the advantage of the utilization of a number of bobbins acting on curved members to obtain at the points of contact the correct pressure obtained by a unique pressure service.

I claim:

1. Stepless variable speed transmission mechanism comprising in combination, a driving axle, a driving revolution body arranged on said axle, a driven body spaced from, and arranged for coaxial revolution about, said driving revolution body, the surface of these bodies, which face each other, being formed according to meridian curves of the same sense of curvature, a plurality of intermediate revolution bodies of elongated form arranged between said driving and driven bodies, the axes of said intermediate bodies being arranged in substantially radial planes at an angle of inclination to the axis of said driving and driven bodies, a gear acting at one point of the axis of each intermediate body for varying said angle during operation of said mechanism, the tilting movement, thereby produced, of the intermediate bodies being determined only by their contact with the driving and driven bodies, the points of contact being situated in the radial planes containing the axes of the intermediate bodies on opposite side of the axes.

2. The mechanism of claim 1, in which bearings are provided each for the support of each intermediate body, trunnions form part of one of said bearings, a gripping member forming part of the gear is pivoted on said trunnions, guiding elements are supported by said trunnions and guides in contact with said elements secure the correct displacement of said bearing under the action of the gear.

3. The mechanism of claim 1, in which bearings are provided for the support of each intermediate body, trunnions form part of one of said bearings, a gripping member forming part of the gear is pivoted on said trunnions, guiding elements being provided on said gripping member and a guideway with cam faces is provided for the guiding elements to transmit the force required for displacing said bearing.

4. The mechanism of claim 1 in combination with bearings supporting the intermediate bodies for free angular displacement of their axes in substantially radial planes, independently movable supports for these bearings, means for adjusting said bearings angularly comprising a guideway formed with cam faces, antifriction elements guided in said guideway, said guideway being capable of slight movements of translation normally to the axis of the driving axle and an operative connection between the guideway and the independently movable supports to secure by a slight movement of translation of the guideway normally to the driving axle an automatic equalization of the loads between diametrically opposite intermediate bodies.

5. The mechanism of claim 1 in combination with bearings supporting the intermediate bodies for free angular displacement of their axes in substantially radial planes and means for adjusting said axes angularly comprising a guideway formed with cam faces, antifriction elements guided in said guideway and an operative connection between said rollers and the intermediate bodies, said guideway being so designed as to be capable of radial deformation to secure equalization of the loads between different pairs of opposite intermediate bodies.

References Cited in the file of this patent

UNITED STATES PATENTS

| Number | Name | Date |
|---|---|---|
| 1,029,641 | Seaver | June 18, 1912 |
| 1,585,140 | Erban | May 18, 1926 |
| 1,856,249 | Hayes | May 3, 1932 |
| 1,979,170 | Nardone | Oct. 30, 1934 |
| 2,252,630 | Heer | Aug. 12, 1941 |
| 2,469,653 | Kopp | May 10, 1949 |
| 2,478,227 | Bannister | Aug. 9, 1949 |
| 2,580,990 | Bannister | Jan. 1, 1952 |

FOREIGN PATENTS

| Number | Country | Date |
|---|---|---|
| 18,627 | France | Mar. 10, 1914 |
| | (Addition to 446,325) | |
| 446,325 | France | Sept. 30, 1912 |
| 605,479 | Great Britain | July 23, 1948 |